(12) United States Patent
Lim et al.

(10) Patent No.: US 10,594,401 B2
(45) Date of Patent: Mar. 17, 2020

(54) DISTRIBUTED ANTENNA SYSTEM FOR TRANSMITTING SERVICE SIGNAL AND MANAGEMENT CONTROL SIGNAL IN 5G MOBILE COMMUNICATION SYSTEM, AND REMOTE UNIT THEREOF

(71) Applicant: FRTEK CO., LTD, Anyang-si, Gyeonggi-do (KR)

(72) Inventors: Byoung-Chul Lim, Seongnam-si (KR); Young-Jun Won, Suwon-si (KR); Youn-Son Hong, Seoul (KR); Ki-Chul Lee, Hwaseong-si (KR); Jun-Hyun Lee, Anyang-si (KR)

(73) Assignee: FRTEK CO., LTD., Anyang-si, Gyeonggi-do (KR)

( * ) Notice: Subject to any disclaimer, the term of this patent is extended or adjusted under 35 U.S.C. 154(b) by 0 days.

(21) Appl. No.: 16/147,287

(22) Filed: Sep. 28, 2018

(65) Prior Publication Data
US 2020/0028590 A1 Jan. 23, 2020

Related U.S. Application Data
(60) Provisional application No. 62/701,443, filed on Jul. 20, 2018.

(51) Int. Cl.
*H04J 14/00* (2006.01)
*H04B 10/29* (2013.01)
(Continued)

(52) U.S. Cl.
CPC ........... *H04B 10/29* (2013.01); *H04B 10/503* (2013.01); *H04B 10/691* (2013.01); *H04J 14/02* (2013.01);
(Continued)

(58) Field of Classification Search
CPC .... H04B 10/29; H04B 10/503; H04B 10/691; H04J 14/02; H04Q 11/0005; H04Q 2011/0016
(Continued)

(56) References Cited

U.S. PATENT DOCUMENTS

2009/0103919 A1* 4/2009 Mickelsson ...... H04B 10/25754
398/48
2009/0238573 A1* 9/2009 Bauman ............... H04B 7/0842
398/115

FOREIGN PATENT DOCUMENTS

KR 10-2009-0072529 A 7/2009
KR 10-2014-0027599 A 3/2014

OTHER PUBLICATIONS

Office Action of corresponding Korean Patent Application No. 10-2017-0172805—4 pages (dated May 15, 2019).

* cited by examiner

*Primary Examiner* — Mohammad R Sedighian
(74) *Attorney, Agent, or Firm* — Knobbe, Martens, Olson & Bear, LLP

(57) ABSTRACT

The present disclosure relates to an optical repeater system for 5th generation (5G) mobile communication. The optical repeater system does not require an additional optical wavelength for a plurality of remote units and can increase the transmission capacity by adding a remote unit without incurring an unnecessary cost, thereby facilitating high-speed and large-capacity data transmission. In addition, the optical repeater system can transmit/receive both a high-speed and large-capacity service signal, as an analog optical signal, and a management control signal, as a digital optical signal, between a master unit and a plurality of remote units. Also, the optical repeater system can selectively and differently compensate for propagation delay times of multiple
(Continued)

paths between a terminal and a base station in a mobile communication system, especially, in the 5G mobile communication system.

8 Claims, 7 Drawing Sheets

(51) Int. Cl.
*H04B 10/69* (2013.01)
*H04J 14/02* (2006.01)
*H04Q 11/00* (2006.01)
*H04B 10/50* (2013.01)

(52) U.S. Cl.
CPC . *H04Q 11/0005* (2013.01); *H04Q 2011/0016* (2013.01)

(58) Field of Classification Search
USPC .................................................. 398/48, 115
See application file for complete search history.

DISTRIBUTED ANTENNA SYSTEM FOR TRANSMITTING SERVICE SIGNAL AND MANAGEMENT CONTROL SIGNAL IN 5G MOBILE COMMUNICATION SYSTEM, AND REMOTE UNIT THEREOF

CROSS-REFERENCE TO RELATED APPLICATIONS

This application claims priority, under 35 U.S.C. § 119, to U.S. Provisional Application No. 62/701,443 filed on Jul. 20, 2018 which is hereby incorporated in its entirety by reference as if fully set forth herein.

TECHNICAL FIELD

The present disclosure relates to an optical repeater system for 5th generation (5G) mobile communications.

BACKGROUND

In order to satisfy the increasing demands of radio data traffic after the commercialization of a 4G mobile communication technology, efforts have been made to develop an advanced 5G mobile communication technology.

In order to accomplish a higher data transfer rate, implementation of the 5G mobile communication technology at super-high frequency (mmWave) bands (e.g., such as a 60 GHz band) are being considered. Also, in order to obviate a propagation loss of radio waves and increase a delivery distance of radio waves in the super-high frequency bands, discussions of the 5G mobile communication technology are underway about various techniques such as beamforming, massive multi-input multi-output (MIMO), full dimensional MIMO (FD-MIMO), array antennas, analog beam-forming, and large scale antennas.

SUMMARY

Additionally, for an improvement in the 5G mobile communication technology, technical developments are being made in advanced small cells, cloud radio access network (cloud RAN), ultra-dense networks, device to device (D2D) communication, wireless backhaul, moving network, cooperative communication, coordinated multi-points (CoMP), reception-end interference cancellation, and the like.

Also, in the 5G mobile communication technology, a hybrid FSK and QAM modulation (FQAM) and a sliding window superposition coding (SWSC) are developed as advanced coding modulation (ACM) schemes, and a filter bank multi carrier (FBMC), a non-orthogonal multiple access (NOMA), and a sparse code multiple access (SCMA) are developed as advanced access techniques.

In this 5G mobile communication technology, a flexible network structure capable of accommodating a variety of existing radio access technologies in one network is required, based on new radio access technologies such as an enhanced mobile broadband (eMBB) service, an ultra-reliable and low latency communication (uLLC) service, and a massive machine type communication (mMTC) service. To this end, core network virtualization and function decentralization technologies are driving the development of a network that can mitigate the burden of processing explosively increasing traffic and address the interconnection and convergence of heterogeneous networks. In addition, a network slice technology is proposed to provide a variety of services to various types of terminals having different features. Providing the respective requirements of services in the unit of slice in one physical network makes it possible to flexibly respond to the services.

In order to satisfy such requirements of the 5G mobile communication technology, an optical repeater system, which is used to economically transmit a base station signal to a subscriber terminal located in a remote or shadow area without additionally constructing a base station in the radio access network, is also required to realize high-speed, large-capacity data transmission.

Accordingly, the present disclosure provides an optical repeater system suitable for the 5G mobile communication technology.

In addition, the present disclosure provides an improved optical repeater system that does not require an additional optical wavelength for a plurality of remote units.

In addition, the present disclosure provides an optical repeater system that can increase the transmission capacity by adding a remote unit without incurring an unnecessary cost, thereby facilitating high-speed and large-capacity data transmission.

Further, the present disclosure provides an optical repeater system capable of transmitting/receiving both a high-speed and large-capacity service signal, as an analog optical signal, and a management control signal, as a digital optical signal, between a master unit and a plurality of remote units.

Further, the present disclosure provides an optical repeater system capable of selectively and differently compensating for propagation delay times of multiple paths between a terminal (also referred to as user equipment, UE, mobile station, MS, etc.) and a base station (also referred to as BS, eNodeB, eNB, gNB, etc.) in a mobile communication system, especially, in the 5G mobile communication system.

According to an embodiment of the present invention, an optical repeater system may comprise a master unit connected to a base station, and a plurality of remote units connected to the master unit in a cascade configuration. The plurality of remote units may include a first remote unit directly connected to the master unit by an optical cable and a second remote unit directly connected to the first remote unit by another optical cable. The master unit may be configured to receive a downlink electric signal from the base station, to convert the received downlink electric signal into a downlink optical signal of a first wavelength, to transmit the converted downlink optical signal to the plurality of remote units through the first remote unit, to receive an uplink optical signal of a second wavelength from the plurality of remote units through the first remote unit, to convert the received uplink optical signal into an uplink electric signal, and to output the converted uplink electric signal to the base station. Each of the remote units may be configured to receive the downlink optical signal from the master unit or a previous remote unit connected thereto, to divide the received downlink optical signal into first and second downlink electric signals, to output the first downlink electric signal to an antenna, to transmit the second downlink electric signal to a subsequent remote unit connected thereto, to receive a first uplink electric signal from the antenna, to receive an uplink optical signal from the subsequent remote unit, to convert the received uplink optical signal into a second uplink electric signal, to combine the first and second uplink electric signals, to convert the combined uplink electric signal into the uplink optical signal, and to transmit the converted uplink optical signal to the master unit or the previous remote unit.

In the optical repeater system, the master unit may include a first analog circuit configured to convert the received downlink electric signal into the downlink optical signal and to convert the received uplink optical signal into the uplink electric signal, and a first wavelength division multiplexer (WDM) disposed between the first analog circuit and the first remote unit and configured to wavelength-divide each of the downlink optical signal and the uplink optical signal.

In the optical repeater system, the master unit may further include a first digital circuit connected to the first WDM and configured to process a digital uplink optical signal inputted from the first WDM and a digital downlink optical signal outputted to the first WDM.

In the optical repeater system, each of the plurality of remote units may include a second analog circuit including a first photodiode configured to convert the downlink optical signal into the downlink electric signal, a second photodiode configured to convert the uplink optical signal into the second uplink electric signal, a first laser diode configured to convert the uplink electric signal into the uplink optical signal, a second laser diode configured to convert the second downlink electric signal into the downlink optical signal, a signal distributor configured to divide the downlink electric signal into the first and second downlink electric signals, and a signal synthesizer configured to combine the first uplink electric signal received from the antenna and the second uplink electric signal received from the second photodiode into the uplink electric signal. Each of the plurality of remote units may further include a second WDM disposed between the master unit or the previous remote unit and both the first photodiode and the first laser diode and configured to wavelength-divide each of the uplink optical signal and the downlink optical signal, and a third WDM disposed between the subsequent remote unit and both the second photodiode and the second laser diode and configured to wavelength-divide each of the uplink optical signal and the downlink optical signal.

In the optical repeater system, the second analog circuit may further include a first automatic gain controller (AGC) configured to adjust a gain of the downlink electric signal outputted from the first photodiode, and a second AGC configured to adjust a gain of the uplink electric signal outputted from the second photodiode.

In the optical repeater system, each of the plurality of remote units may further include a second digital circuit connected to the second and third WDMs and configured to output a downlink digital optical signal, received from the second WDM, to the subsequent remote unit through the third WDM, and to output an uplink digital optical signal, received from the third WDM, to the master unit or the previous remote unit through the second WDM.

In the optical repeater system, each of the plurality of remote units may further include an optical switch disposed among the second and third WDMs, one of the master unit and the previous remote unit, and the subsequent remote unit, and configured to connect the second WDM to one of the master unit and the previous remote unit or connect the third WDM to the subsequent remote unit.

The optical repeater system may further comprise an optical delay control device. In the optical repeater system, the plurality of remote units may include a plurality of the first remote units which are directly connected to the base station, are disposed in a parallel configuration, and form multiple paths with the master unit. Also, the optical delay control device may be provided on the multiple paths, include a plurality of cable members having different lengths on each of the multiple path, and be configured to compensate for a propagation delay time of each path by selectively connecting the plurality of cable members to each path.

In the optical repeater system, the master unit may be connected to the base station through a wired cable and be configured to transmit or receive at least one of an uplink signal, a downlink signal, or a reference signal for synchronization to or from the base station at an intermediate frequency (IF) band.

In the optical repeater system, the optical delay control device may further include a plurality of optic switches provided on each path to selectively connect the plurality of cable members to each path, and a first controller configured to differently control the plurality of optic switches provided respectively on the multiple paths.

In the optical repeater system, each of the plurality of optic switches may have two selectable ends. Also, two of the optic switches may be disposed at both ends of each cable member, respectively, thus forming a pair. And also, one selectable end of the optic switch may be connected to one end of the cable member, and other selectable end of the optic switch may be connected to the corresponding optic switch in the pair.

DETAILED DESCRIPTION

Figure 1:
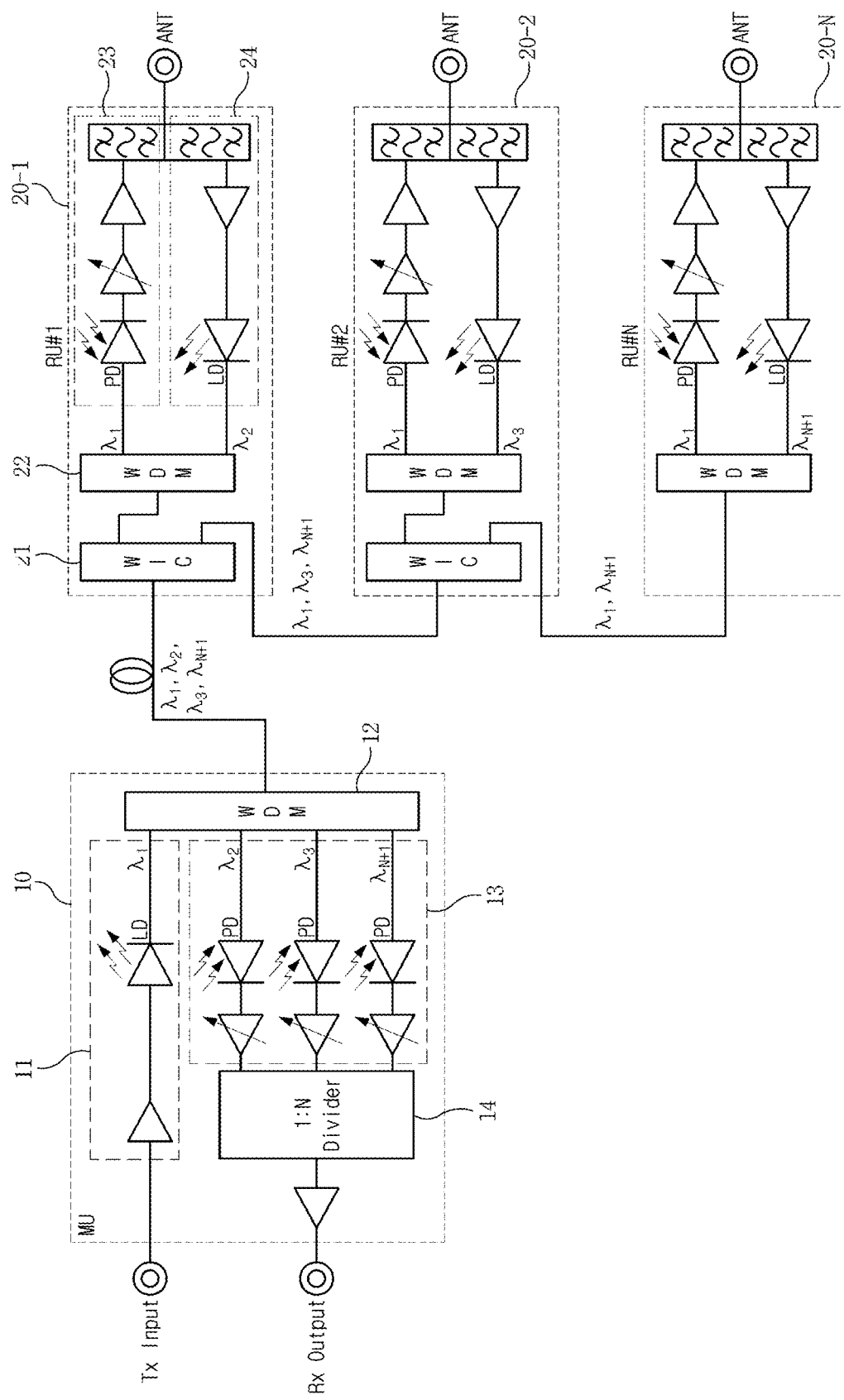
FIG. 1 is a diagram illustrating an optical repeater system.

FIG. 1 is a diagram illustrating an optical repeater system. Referring to FIG. 1, the optical repeater system includes a master unit (MU) 10 and a plurality of remote units (RUs) 20-1, 20-2, . . . 20-N. The master unit 10 is connected to a base station (not shown), and each of the remote units 20-1, 20-2, . . . , 20-N deployed in remote or shadow areas is connected to terminals (not shown). The master unit 10 and the remote units 20-1, 20-2, . . . , 20-N are connected by an optical cable. Specifically, the master unit 10 is connected to one remote unit 20-1 by one optical cable and also connected to the remaining remote units 20-2, . . . , 20-N by the optical cable via optical couplers 21.

In such an optical connection structure, since the plurality of remote units 20-1 to 20-N share the optical cable connected to the master unit 10, the remote units 20-1 to 20-N should use different wavelengths of uplink optical signals such that the uplink optical signals transmitted from the respective remote units 20-1 to 20-N can be distinguished from each other.

The master unit 10 receives a downlink electric signal from the base station through a first analog circuit 11, converts the received downlink electric signal into a downlink optical signal of a first wavelength ($\lambda_1$), and transmits the downlink optical signal through the optical cable. This downlink optical signal is then sequentially delivered to the plurality of remote units 20-1 to 20-N through the optical couplers 21. Each of the remote units 20-1 to 20-N converts the received downlink optical signal into a downlink electric signal and outputs it to an antenna ANT. Therefore, the downlink electric signal transmitted by the base station can be provided to terminals in a service area in the form of a radio signal.

Inversely, uplink electric signals transmitted by the terminals arrive at the antennas of the remote units 20-1 to 20-N, are converted into uplink optical signals of second to N+1$^{th}$ wavelengths ($\lambda_2$ to $\lambda_{N+1}$), and then transmitted to the master unit 10. At this time, because of having different wavelengths, the uplink optical signals transmitted from the remote units 20-1 to 20-N can be transmitted together without affecting each other.

When the master unit 10 receives the uplink optical signals, the master unit 10 converts the uplink optical signals into uplink electric signals through a second analog circuit 13 and transmits the uplink electric signals to the base station.

In order to connect the N remote units 20-1 to 20-N in this optical repeater system that allocates different wavelengths of uplink optical signals to the remote units 20-1 to 20-N, total N+1 optical signal wavelengths, i.e., one downlink optical signal wavelength and N uplink optical signal wavelengths, are required.

Therefore, the optical repeater system of FIG. 1 has a limitation in further connecting the remote units and also has a disadvantage of unstable signal transmission due to a signal loss as it goes to the rear end of the system.

Meanwhile, in the optical repeater system of FIG. 1 that adopts a parallel structure, the master unit and the remote units may be often connected by optic cables of different lengths depending on locations of the remote units. Thus, even though connected to the same master unit, the respective remote units have different propagation delay times due to different lengths of the optic cables. Unfortunately, this may cause a difference in the propagation delay times of multiple paths between the base station and the terminal and thereby invite the deterioration of communication quality.

Hereinafter, various embodiments of the present invention will be described in detail with reference to the accompanying drawings. It should be understood that embodiments and terminology used therein are not intended to limit the disclosed technique to particular implementation, but various modifications, equivalents, and/or alternatives of the embodiments are included. In the description of the drawings, like reference numerals may be used for similar elements.

In this disclosure, the terms such as "comprise", "include", and "have" denote the presence of stated elements, components, operations, functions, features, and the like, but do not exclude the presence of or a possibility of addition of one or more other elements, components, operations, functions, features, and the like.

In this disclosure, the expressions "A or B", "at least one of A and/or B", and the like may include all possible combinations of items listed together. For example, "A or B", "at least one of A and B", or "at least one of A or B" may indicate all of (1) including at least one A, (2) including at least one B, and 3) including both of at least one A and at least one B.

The expressions including ordinal numbers, such as "first" and "second," may indicate various elements. The above expressions do not limit the sequence or importance of the elements, and are used merely for the purpose to distinguish one element from the others. For example, a first electronic device and a second electronic device may indicate different electronic devices regardless of the sequence or importance thereof. For example, without departing from the scope of the present disclosure, a first element may be referred to as a second element, and similarly a second element may be also referred to as a first element.

When a certain element (e.g., first element) is referred to as being "connected" or "coupled" (operatively or communicatively) to another element (e.g., second element), it may mean that the first element is connected or coupled directly to the second element or indirectly through any other element (e.g., third element). On the other hand, when a certain element (e.g., first element) is referred to as being "directly connected" or "directly coupled" to another element (e.g., second element), it may be understood that there is no element (e.g., third element) therebetween.

The expression "configured to" may be interchangeably used with any other expressions "suitable for", "having the ability to", "designed to", "adapted to", "made to", "being able to", and "capable of". The expression "device configured to" may mean that the device, together with other devices or components, "is able to". For example, the phrase "processor configured to perform A, B and C" may mean a dedicated processor (e.g., embedded processor) for performing corresponding operations or a generic-purpose processor (e.g., central processing unit (CPU) or application processor (AP)) capable of performing corresponding operations by executing one or more software programs stored in a memory.

Terms used herein may be merely to describe a certain embodiment, and may not be intended to limit the scope of other embodiments. The singular expressions may include plural expressions unless the context clearly dictates otherwise. Terms used herein, including technical or scientific terms, may have the same meaning as commonly understood by those skilled in the art. Some terms defined in a normal dictionary may be interpreted as having the same or similar meaning as the contextual meanings in the related art. Certain terms are not to be construed as an ideal or overly formal detect unless expressly defined to the contrary herein. In some cases, the terms defined herein cannot be construed to exclude embodiments of the present disclosure.

An optical repeater system according to embodiments of the present invention includes a master unit (MU) and a plurality of remote units (RUs). The master unit is connected to a base station, and the plurality of remote units are connected to the master unit in a cascade structure and/or a parallel structure. The optical repeater system of FIG. 4 to be described later corresponds to a cascade structure, and the optical repeater system of FIG. 5 to be described later corresponds to a parallel structure. However, as will be apparent to a person skilled in the art, it is also possible to arrange a plurality of remote units in both a cascade structure and a parallel structure by integrating the optical repeater systems of FIGS. 4 and 5. This will be described later.

Signals processed in the optical repeater system according to embodiments of the present invention are divided into a downlink signal transmitted to the terminal by the base station and an uplink signal transmitted to the base station by the terminal. In particular, depending on a signal type and a transmission medium, such a signal may be formed of an electric signal or an optical signal. In the following description, the uplink signal will be also referred to as an uplink electric signal or an uplink optical signal, and similarly the downlink signal will be referred to as a downlink electric signal or a downlink optical signal.

The master unit converts a downlink electric signal, received from the base station, into a downlink optical signal and transmits the downlink optical signal. Also, the master unit converts an uplink optical signal, received from the remote unit, into an uplink electric signal and transmits the uplink electric signal. Each of the remote units converts an uplink electric signal, received from the terminal located in the communication coverage, into an uplink optical signal and transmits the uplink optical signal to the master unit. Also, each remote unit converts a downlink optical signal received from the master unit, into a downlink electric signal and transmits the downlink electric signal.

Now, the master unit and the remote unit will be described with reference to FIGS. 2 and 3, respectively.

Figure 2:
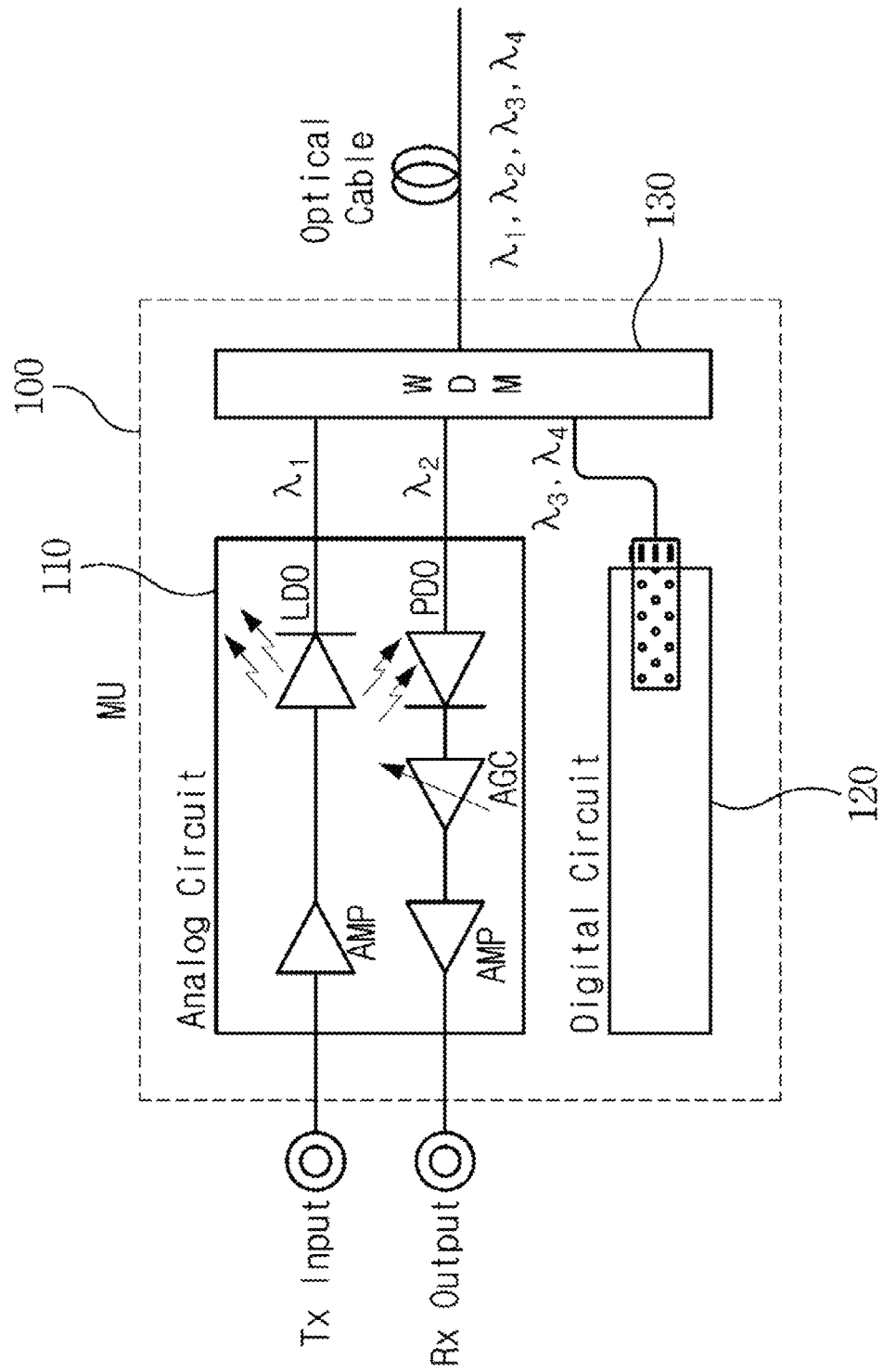
FIG. 2 is a diagram illustrating a master unit of an optical repeater system according to an embodiment of the present invention.

FIG. 2 is a diagram illustrating a master unit of an optical repeater system according to an embodiment of the present invention.

Referring to FIG. 2, the master unit 100 includes a first analog circuit 110, a first digital circuit 120, and a first wavelength division multiplexer (WDM) 130.

The first analog circuit 110 includes a laser diode LD0 for converting an electric signal into an optical signal, a photodiode PD0 for converting an optical signal into an electric signal, an automatic gain controller (AGC), and an amplifier (AMP). The first analog circuit 110 receives a downlink electric signal and converts it into a downlink optical signal. Also, the first analog circuit 110 receives an uplink optical signal and converts it into an uplink electric signal. Such a signal transmitted or received at the first analog circuit 110 is a communication service signal transmitted or received between the base station and the terminal.

The first digital circuit 120 processes a digital optical signal. The digital optical signal transmitted or received at the first digital circuit 120 is a management control signal for equipment management transmitted or received between the master unit 100 and the remote unit 200. Specifically, the first digital circuit 120 can transmit or receive the management control signal of a predetermined size (e.g., 10 Mbps) to or from the plurality of remote units 200. In embodiments, the management control signal includes inter-equipment communication information, a synchronization signal of a time division duplex (TDD) signal, and a delay control signal according to a cascade connection in the plurality of remote units 200.

The first WDM 130 separates optical signals of two wavelengths inputted from an optical cable into an uplink optical signal and a digital uplink optical signal and then outputs them to the first analog circuit 110 and the first digital circuit 120, respectively. In addition, the first WDM 130 combines a downlink optical signal and a digital downlink optical signal inputted from the first analog circuit 110 and the first digital circuit 120, respectively, and then outputs the combined optical signal to the optical cable.

Figure 3:
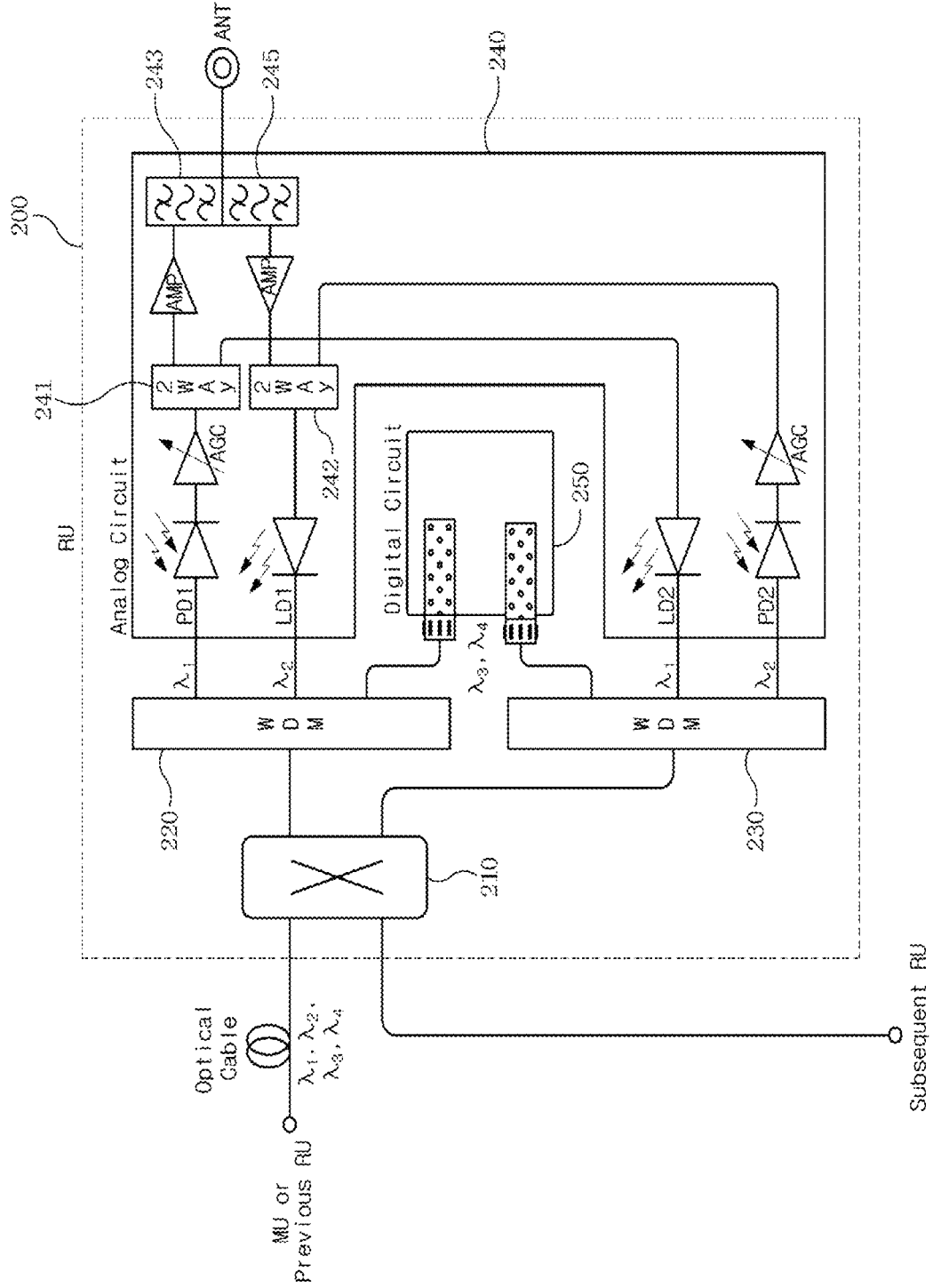
FIG. 3 is a diagram illustrating a remote unit of an optical repeater system according to an embodiment of the present invention.

FIG. 3 is a diagram illustrating a remote unit of an optical repeater system according to an embodiment of the present invention.

Referring to FIG. 3, the remote unit 200 includes an optical switch 210, a second WDM 220, a third WDM 230, a second analog circuit 240, and a second digital circuit 250.

The optical switch 210 includes four selectable ports. One selectable port is connected to a certain previous device (e.g., the master unit 100 or another remote unit disposed at the front end of the remote unit 200) by an optical cable, and another selectable port is connected to a certain subsequent remote unit by another optical cable. In addition, the remaining two selectable ports are connected to the second and third WDMs 220 and 230, respectively. The second and third WDMs 220 and 230 are connected to the second analog circuit 240 and the second digital circuit 250, respectively.

The second analog circuit 240 includes a first photodiode PD1, a second photodiode PD2, a first laser diode LD1, a second laser diode LD2, a signal distributor 241, and a signal synthesizer 242. The first photodiode PD1 converts a downlink optical signal, received from the second WDM 220, into a downlink electric signal. The second photodiode PD2 converts an uplink optical signal, received from the third WDM 230, into a second uplink electric signal. The first laser diode LD1 converts an uplink electric signal, received from the signal synthesizer 242, into an uplink optical signal. The second laser diode LD2 converts a second downlink electric signal, received from the signal distributor 241, into a downlink optical signal. The signal distributor 241 divides a downlink electric signal, received from the first photodiode PD1, into first and second downlink electric signals, then outputs the first downlink electric signal to the antenna ANT, and also outputs the second downlink electric signal to the second laser diode LD2. The signal synthesizer 242 combines a first uplink electric signal received from the antenna ANT and a second uplink electric signal received from the second photodiode PD2 into an uplink electric signal and then outputs the combined uplink electric signal to the first laser diode LD1.

In embodiments, the second analog circuit 240 further includes automatic gain controllers (AGCs), band stop filters 243 and 245, amplifiers AMPS, and the like. The AGCs adjust the gains of the downlink electric signal and the second uplink electric signal outputted from the first and second photodiodes PD1 and PD2, respectively. The band stop filters 243 and 245 perform filtering the downlink electric signal to be transmitted through the antenna ANT and the uplink electric signal received through the antenna ANT, respectively.

According to the above-discussed configuration, the downlink optical signal received from the previous device is transmitted to the first photodiode PD1 through the second WDM 220, converted into the downlink electric signal, gain-adjusted at the AGC, and then divided into two signals (i.e., first and second downlink electric signals) through the signal distributor 241.

The first downlink electric signal is outputted to the antenna ANT through the amplifier AMP and the band stop filter 243. The second downlink electric signal is converted into the downlink optical signal at the second laser diode LD2 and then transmitted to another remote unit (connected to the rear end) through the third WDM 230.

The first uplink electric signal received through the antenna ANT is filtered through the band stop filter 245, amplified through the amplifier AMP, and then inputted to the signal synthesizer 242. The uplink optical signal transmitted from another remote unit connected to the rear end is inputted to the second photodiode PD2 through the optical switch 210 and the third WDM 230, converted into the second uplink electric signal, and inputted to the signal synthesizer 242.

The signal synthesizer 242 combines the received first and second uplink electric signals and then inputs the combined signal to the first laser diode LD1. The first laser diode LD1 converts the combined signal into the uplink optical signal and then transmits the uplink optical signal to a certain previous device (e.g., the master unit 100 or another remote unit connected to the front end) through the second WDM 220 and the optical switch 210.

As described above, the remote unit 200 converts the downlink optical signal, received from the previous device, into the downlink electric signal, and transmits the downlink electric signal to the antenna ANT. Simultaneously, the remote unit 200 converts again the downlink electric signal into the downlink optical signal, and delivers it to the subsequent device. Further, the remote unit 200 converts the uplink optical signal, received from the subsequent device, into the uplink electric signal, combines it with another uplink electric signal received through the antenna ANT, converts the combined signal into the uplink optical signal, and transmits the uplink optical signal to the previous device. In this cascade configuration, signals can be exchanged between one master unit 100 and the plurality of remote units 200.

Meanwhile, the second digital circuit 250 processes a digital optical signal transmitted to or received from the master unit 100. In addition, the second digital circuit 250 outputs a downlink digital optical signal, received from the second WDM 220, to the subsequent remote unit through the third WDM 230. Also, the second digital circuit 250 outputs an uplink digital optical signal, received from the third WDM 230, to the previous master unit or the previous remote unit through the second WDM 220. Thus, the second digital circuit 250 receives the management control signal from the master unit 100 and performs, based on the management control signal, synchronization processing, delay control, and/or inter-equipment communication.

Figure 4:
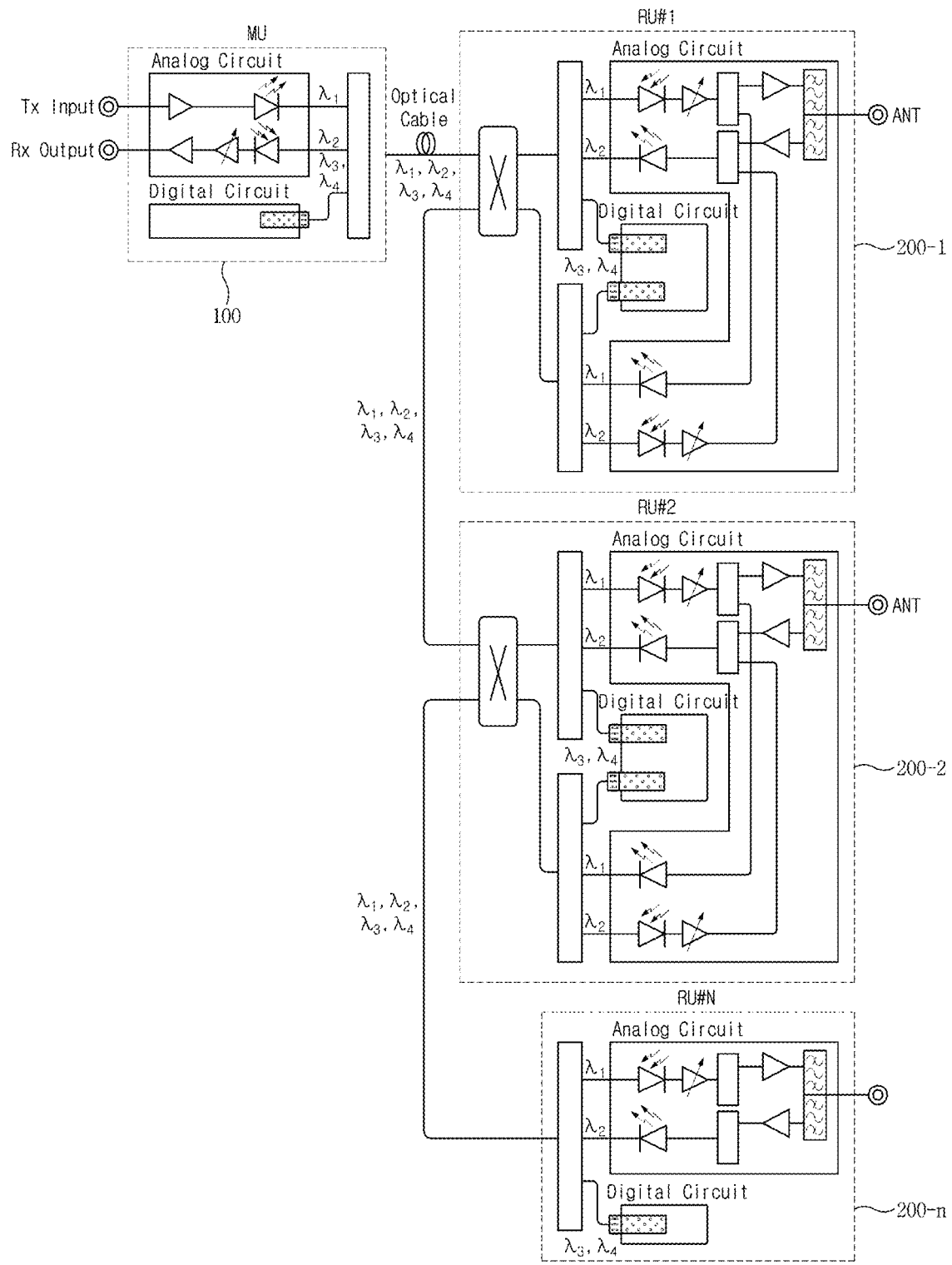
FIG. 4 is a diagram illustrating an optical repeater system according to an embodiment of the present invention.

FIG. 4 is a diagram illustrating an optical repeater system according to an embodiment of the present invention.

Referring to FIG. 4, the optical repeater system has a structure in which N remote units 200-1 to 200-N are sequentially connected to one master unit 100 in a cascade configuration. For convenience, a remote unit directly connected to the master unit 100 through an optical cable is referred to as a first remote unit 200-1, and a remote unit directly connected to the first remote unit 200-1 through another optical cable is referred to as a second remote unit 200-2. A finally connected remote unit is called a $N^{th}$ remote unit 200-N. Since the $N^{th}$ remote unit 200-N has no subsequent connection, in embodiments, the optical switch 210 and the third WDM 230 are omitted from the $N^{th}$ remote unit 200-N.

In this optical repeater system, optical signals transmitted between one master unit 100 and N remote units 200-1 to 200-N are classified into an uplink optical signal, a downlink optical signal, a digital uplink optical signal, and a digital downlink optical signal. These four-type optical signals use different wavelengths.

Specifically, the downlink optical signal of the first wavelength ($\lambda_1$) transmitted by the master unit 100 is transmitted to the first remote unit 200-1, which delivers the downlink optical signal to the second remote unit 200-2 connected to the rear end thereof. Finally, the downlink optical signal is transmitted sequentially up to the $N^{th}$ remote unit 200-N.

In this case, the downlink optical signal received by each remote unit is what is converted again after both the conversion into the electric signal and the loss compensation through the gain adjustment are previously performed by the previous remote unit. Therefore, each remote unit can receive the downlink optical signal having a certain gain regardless of connected disposition.

Each of the first to $N^{th}$ remote units 200-1 to 200-N receives the uplink electric signal through the antenna ANT and converts it into the uplink optical signal of the second wavelength ($\lambda_2$). Also, each of the first to $N-1^{th}$ remote units 200-1 to 200-N-1 receives another uplink optical signal of the second wavelength ($\lambda_2$) from each subsequent remote unit and combines it with the converted uplink optical signal. A resultant uplink optical signal is then transmitted to a certain previous device (i.e., the master unit 100 or the previous remote unit).

Therefore, the uplink optical signal of the second wavelength ($\lambda_2$) finally transmitted to the master unit 100 contains all the uplink signals received by the first to $N^{th}$ remote units 200-1 to 200-N via the antenna ANT.

In embodiments, the digital uplink optical signal and the digital downlink optical signal are transmitted in the same manner as described above.

As described hereinbefore, the optical repeater system does not need to have different wavelengths for the respective remote units 200. It is therefore possible to overcome a connection limit of the remote units 200 and also secure stability by compensating for signal loss.

Figure 5:
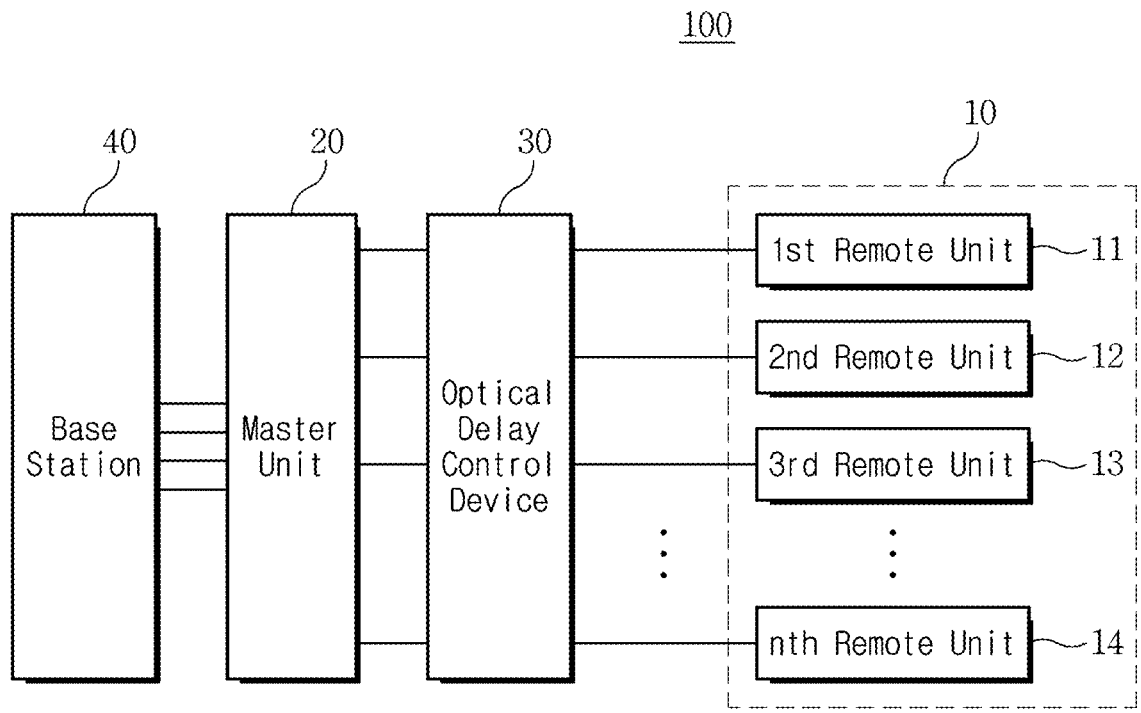
FIG. 5 is a diagram illustrating an optical repeater system according to another embodiment of the present invention.

FIG. 5 is a diagram illustrating an optical repeater system according to another embodiment of the present invention.

Referring to FIG. 5, the optical repeater system 100 is provided to minimize a difference in propagation delay times of multiple paths between a terminal (not shown) and a base station 40 by selectively and differently compensating for the propagation delay times. The optical repeater system 100 is available for, but not limited to, the 5G mobile communication system. The optical repeater system 100 can be also applied to the 4G or 3G mobile communication system.

The optical repeater system 100 includes a plurality of remote units (RUs) 10, a master unit (MU) 20, and an optical delay control device 30.

The plurality of remote units 10 are installed at different positions, respectively, and each performs wireless communication with at least one terminal located within communication coverage thereof. Specifically, the remote unit 10 receives an uplink radio signal from the terminal and also transmits a downlink radio signal to the terminal. In FIG. 5, the remote units 10 are shown as a first remote unit 11, a second remote unit 12, a third remote unit 13, and an $n^{th}$ remote unit 14 ('n' is a natural number of 2 or more), which are connected to the master unit 20 in a parallel configuration. This is, however, exemplary only. Alternatively, in embodiments, the remote units are arranged in a cascade configuration as discussed above. Also, in embodiments, each of the first to $n^{th}$ remote units 11 to 14 correspond to the first remote unit 200-1 which is described above in FIG. 4. That is, the cascade configuration of FIG. 4 can be used together with the parallel configuration of FIGS. 5 and 6.

Each remote unit 10 is connected to the master unit 20 through an optic cable and receives a downlink signal in the form of an optical signal from the master unit 20. Then the remote unit 10 converts the received signal into a radio frequency (RF) signal through photoelectric conversion and transmits the RF signal to the terminal. In addition, the remote unit 10 receives an uplink signal in the form of an RF signal from the terminal, converts the received signal into an optical signal through photoelectric conversion, and transmits the optical signal to the master unit 20 through the optic cable.

The master unit 20 connected to the remote units 10 through the optic cables is also connected to the base station 40 through a wired cable and performs communication with the base station 40. The master unit 20, in embodiments, further performs a function of amplifying a signal. The master unit 20 can transmit or receive a mobile communication signal to or from the base station at an intermediate frequency (IF) band rather than at the mmWave band. In addition, the master unit 20 can receive a reference signal (e.g., 10 MHz) for synchronization from the base station 40 through the wired cable. This allows simple and cost-effective synchronization. Also, when the base station 40 adopts a time division duplex (TDD) scheme to transmit or receive a downlink or uplink signal, the master unit 20 can receive a TDD-based signal through the wired cable and relay the TDD-based signal. That is, the master unit 20 can perform a wired interworking based on the IF band with the base station 40.

When receiving a downlink signal from the base station 40 at the IF band, the master unit 20 converts the downlink signal of the IF band into an optical signal through photoelectric conversion and transmits the optical signal to the remote units 10 through the optic cables. In addition, the master unit 20 converts an optical signal, received from each remote unit 10, into an uplink signal of the IF band through photoelectric conversion and transmits the uplink signal to the base station 40 via the wired cable.

Meanwhile, multiple paths between the master unit 20 and the respective remote units 10, in embodiments, cause different radio propagation delay times.

To address this issue, the optical repeater system 100 further includes an optical delay control device 30 provided between the master unit 20 and a set of the plurality of remote units 10.

The optical delay control device 30 is configured to obtain a stable and reliable communication quality by selectively and differently compensating for a propagation delay time on each of multiple paths. That is, based on the fact that the propagation delay time is varied depending on the length of the optic cable, the optical delay control device 30 compensates for the propagation delay time of each path between the base station 40 and the terminal by adjusting the length of the optic cable on each path. Through this, the optical delay control device 30 can compensate for the propagation delay time from several hundreds of nanoseconds to several hundreds of microseconds. In addition, the optical delay control device 30 is capable of compensating for the propagation delay time with respect to the entire optical wavelength rather than a specific wavelength.

Meanwhile, the master unit 20 can calculate the propagation delay time caused when transmitting a signal to the remote unit 10 through each transmission path, and then provide the calculated propagation delay time to the optical delay control device 30.

In addition, the optical delay control device 30 can compensate for the propagation delay time by dynamically changing the length of the optic cable through an external control by the remote units 10 and the master unit 20. The configuration and operation of the optical delay control device 30 will be described in more detail later.

Now, a process of transmitting downlink and uplink signals in the optical repeater system 100 will be described hereinafter.

In case of a forward channel (i.e., downlink), a downlink signal is transmitted from the base station 40 to the master unit 20. The master unit 20 removes a noise of the downlink signal, amplifies the signal, and converts the amplified signal into an optical signal. Then, the master unit 20 transmits the optical signal to the remote units 10 through the optic cable. At this time, the optical signal passes through the optical delay control device 30, and the optical delay control device 30 compensates for the propagation delay time due to a transmission distance difference. After compensation for the propagation delay time, the optical signal is transmitted to the remote units 10. Each remote unit 10 converts the optical signal, received through the optical delay control device 30, into an RF signal, amplifies the RF signal to an effective output for wirelessly transmitting the RF signal, and transmits the amplified RF signal to the terminal.

In case of a backward channel (i.e., uplink), an uplink RF signal is transmitted from the terminal to the remote unit 10. The remote unit 10 removes a noise of the uplink signal, amplifies the signal, and converts the amplified signal into an optical signal. Then, the optical signal is transmitted to the optical delay control device 30 through the optic cable, and the optical delay control device 30 compensates for the propagation delay time due to a path difference. Thereafter, the optical signal is transmitted to the master unit 20 through the optic cable. The master unit 20 converts the received optical signal into an uplink signal of the IF band, amplifies the IF signal to an effective output, and transmits the amplified signal to the base station 40.

Now, the configuration and operation of the optical delay control device 30 in the optical repeater system 10 will be described hereinafter in more detail.

Figure 6:
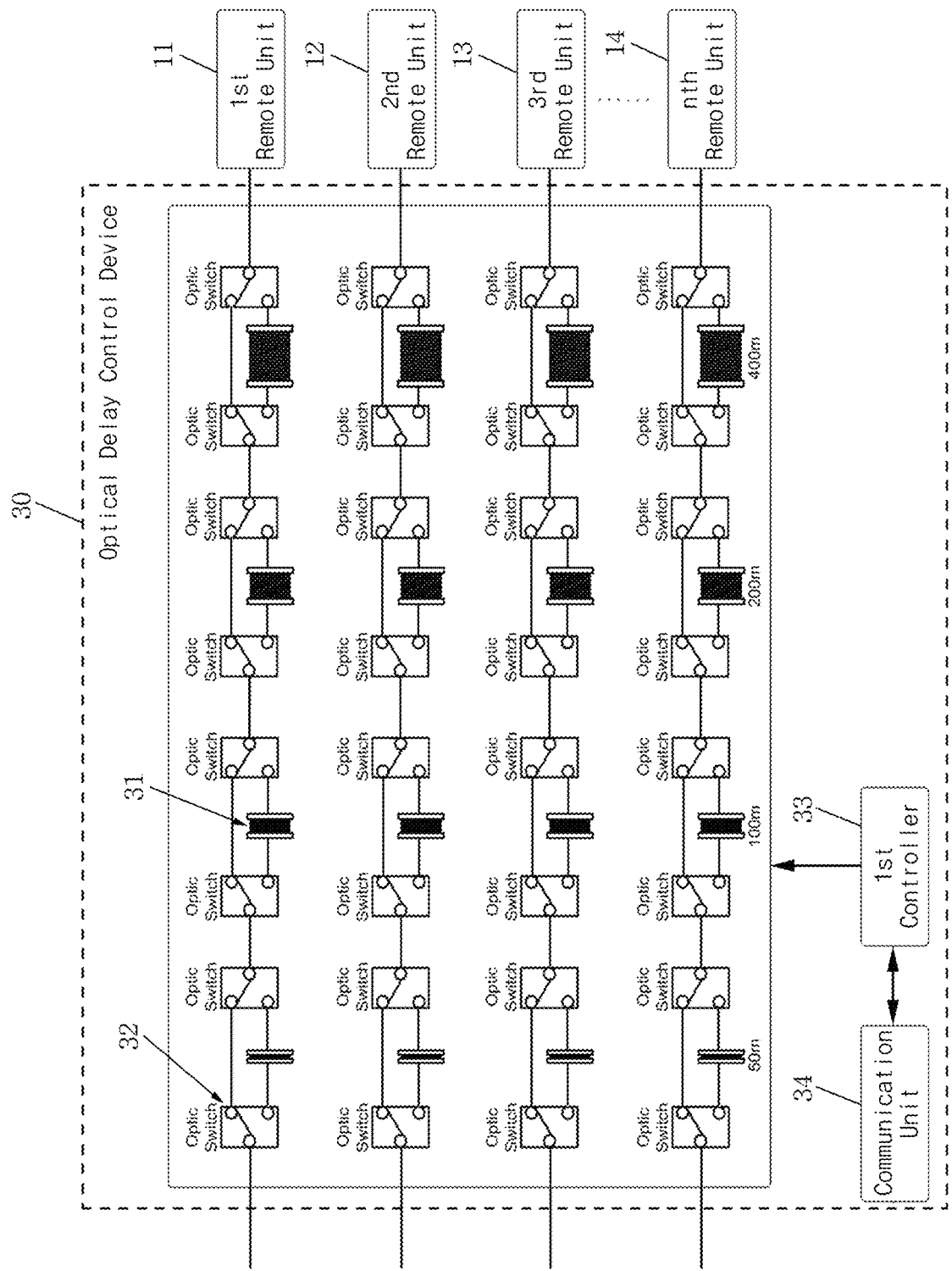
FIG. 6 is a diagram illustrating an optical delay control device of an optical repeater system according to an embodiment of the present invention.

FIG. 6 is a diagram illustrating an optical delay control device of an optical repeater system according to an embodiment of the present invention.

Referring to FIGS. 5 and 6, the optical delay control device 30 includes a plurality of cable members 31, a plurality of optic switches 32, and a first controller 33. Also, the optical delay control device 30, in embodiments, further includes a communication unit 34 configured to provide a control signal to the first controller 33.

In addition, since the optical delay control device 30 is provided between the master unit 20 and a set of the plurality of remote units 10 (i.e., 11, 12, 13 and 14), the plurality of cable members 31 and the plurality of optic switches 32 are provided on each delivery path that connects the master unit 20 and each of the remote units 10.

In embodiments, the cable member 31 is an additional optic cable distinguished from the optic cable previously used for the path. In particular, the respective cable members 31 provided on each delivery path have different lengths such as, for example, 50 m, 100 m, 200 m, 400 m, 800 m, and 1600 m. Here, the longer the cable member 31 is, the greater the delay time becomes. The delay time according to the length of the cable member 31 may be several hundred nanoseconds to several hundred microseconds. The respective cable members 31 having different lengths are disposed in series on each delivery path between each remote unit 11, 12, 13 or 14 and the master unit 20.

The plurality of optic switches 32 are configured to selectively connect the respective cable members 31 having different lengths to the delivery path connected with each remote unit. Each optic switch 32 has two selectable ends. Two optic switches 32 are disposed at both ends of each cable member 31, respectively, thus forming a pair. One selectable end of the optic switch 32 is connected to one end of the cable member 31, and the other selectable end of the optic switch 32 is connected to the corresponding optic switch in the pair.

Therefore, a switching operation of the pair of optic switches 32, in embodiments, enables the cable member 31 to be selectively connected to the delivery path between each remote unit 11, 12, 13 or 14 and the master unit 20. That is, the pair of optic switches 32 disposed at both ends of each cable member 31 switches an optical path.

The first controller 33 identifies the propagation delay time of a signal. The propagation delay time is calculated for each path by comparing a propagation time of an actually transmitted signal with a predetermined propagation time.

The first controller 33, in embodiments, identifies the propagation delay time for each path by receiving it from an external device such as the master unit 20. The predetermined propagation time refers to a radio propagation time in case where no delay occurs. The first controller 33 controls the plurality of optic switches 32 to connect at least one cable member 31 having a length corresponding to a compensation time determined according to the calculated propagation delay time. All available compensation times are determined according to combinations of the plurality of cable members 31 having different lengths.

For example, when the compensation time is equal to the delay time corresponding to the sum of lengths of four cable members 31 shown in FIG. 6, the first controller 33 controls all the optic switches 32 disposed at both ends of each of four cable members 31 to select the cable members 31. Therefore, four cable members 31 having different lengths are connected in series, and it is possible to compensate for the propagation delay time by the sum of the lengths.

In another example, when the compensation time is 2.5 μs, the first controller 33 controls the optic switches 32 to connect a 100 m cable member having a delay time of 0.5 μs and also connect a 400 m cable member having a delay time of 2 μs. In this case, the optic switches 32 select only the 100 m cable member and the 400 m cable member and do not select the other cable members (i.e., a 50 m cable member and a 200 m cable member in this example).

Meanwhile, in embodiments, the first controller 33 controls the plurality of optic switches 32 in response to a command received from the communication unit 34. Therefore, a manager can control the optic switches 32 remotely.

In embodiments, the communication unit 34 performs communication with an external manager terminal (not shown) and receives a user input or command from the manager terminal. Alternatively or additionally, the communication unit 34 receives a user input or command from the remote unit 10 or the master unit 20. In embodiments, the user input or command is a control signal for selectively controlling the optic switches 32.

In addition, in embodiments, a mapping table that defines a relation between a control signal for each optic switch 32 and a corresponding compensation time (or delay time) is stored in advance. Based on such a mapping table, the first controller 33 selectively controls the plurality of optic switches 32.

As described hereinbefore, in embodiments, the optical delay control device 30 not only automatically compensates for the propagation delay time, but also selectively control such compensation for the propagation delay through at least one of the manager terminal, the remote unit 10, and the master unit 20.

Figure 7:
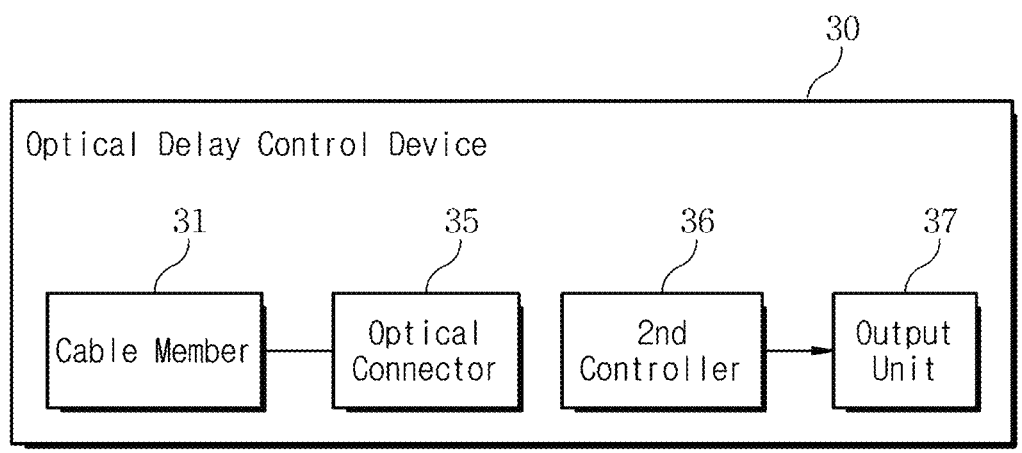
FIG. 7 is a diagram illustrating an optical delay control device of an optical repeater system according to another embodiment of the present invention.

FIG. 7 is a diagram illustrating an optical delay control device of an optical repeater system according to another embodiment of the present invention.

Referring to FIGS. 5 and 7, in embodiments, the optical delay control device 30 includes a cable member 31, an optical connector 35, a second controller 36, and an output unit 37. The cable member 31 has the same structure as that of the previous embodiment. Instead of the optic switch 32 of the previous embodiment, the optical connector 35 is used. That is, a plurality of the optical connectors 35 may be used to selectively connect the cable members 31 having different lengths on each delivery path.

The optical connectors 35 are disposed at both ends of the respective cable members 31 and selectively connect at least one of the cable members 31 in series on the delivery path. That is, each optical connector 35 is inserted between adjacent cable members 31 and switches an optical path. In embodiments, the optical connector 35 is manually combined with the cable member 31.

The second controller 36 identifies the propagation delay time of a signal. The propagation delay time is calculated for each path by comparing a propagation time of an actually transmitted signal with a predetermined propagation time. The predetermined propagation time refers to a radio propagation time in case where no delay occurs. In embodiments, the second controller 36 identifies the propagation delay time for each path by receiving it from the master unit 20. In addition, the second controller 36 detects the optical connector 35 corresponding to the cable member 31 having the same delay time as the compensation time for the identified propagation delay time. Then, the second controller 36 controls the detected optical connector 35 to be connected with the cable member 31 having the same delay time as the compensation time. That is, the second controller 36 displays, on the output unit 37, the detected optical connector 35 and the cable member 31 having the same delay time as the compensation time, so that the manager can directly combine the optical connector 35 and the corresponding cable member 31. In addition, if the compensation time is equal to the sum of the delay times of two or more selected cable members 31, the second controller 36 controls the optical connectors 35 corresponding to the selected cable members 31 to be connected.

The output unit 37 outputs information about the optical connector 35 and the cable member 31 to be connected in order to compensate for the propagation delay time. Such information may be outputted in the form of graphical information displayed on a screen or audible information reproduced through a speaker. The manager can combine the cable member 31 and the optical connector 35 on the basis of such information outputted from the output unit 37.

In certain embodiments, the optical delay control device 30 requires the manager to combine the cable member 31 and the optical connector 35. Compared with other embodiments of applying the optic switch, this configuration may reduce incurred cost and prevent a loss occurring in the optic switch.

While this disclosure has been shown and described with reference to certain embodiments thereof, it will be understood by those skilled in the art that various changes in form and details may be made therein without departing from the scope of the present invention as defined by the appended claims.

What is claimed is:

1. An optical repeater system comprising:
a master unit connected to a base station; and
a plurality of remote units connected to the master unit in a cascade configuration,
wherein the plurality of remote units include a first remote unit directly connected to the master unit by an optical cable and a second remote unit directly connected to the first remote unit by another optical cable,
wherein the master unit is configured to:
receive a downlink electric signal from the base station,
convert the received downlink electric signal into a downlink optical signal of a first wavelength,
transmit the converted downlink optical signal to the plurality of remote units through the first remote unit,
receive an uplink optical signal of a second wavelength from the plurality of remote units through the first remote unit, convert the received uplink optical signal into an uplink electric signal, and output the converted uplink electric signal to the base station, and wherein each of the remote units is configured to:

receive the downlink optical signal from the master unit or a previous remote unit connected thereto, divide the received downlink optical signal into first and second downlink electric signals, output the first downlink electric signal to an antenna, transmit the second downlink electric signal to a subsequent remote unit connected thereto, receive a first uplink electric signal from the antenna, receive an uplink optical signal from the subsequent remote unit, convert the received uplink optical signal into a second uplink electric signal, combine the first and second uplink electric signals, convert the combined uplink electric signal into the uplink optical signal, and transmit the converted uplink optical signal to the master unit or the previous remote unit, wherein each of the plurality of remote units includes:

a first analog circuit including:

a first photodiode configured to convert the downlink optical signal into the downlink electric signal, a second photodiode configured to convert the uplink optical signal into the second uplink electric signal, a first laser diode configured to convert the uplink electric signal into the uplink optical signal, a second laser diode configured to convert the second downlink electric signal into the downlink optical signal, a signal distributor configured to divide the downlink electric signal into the first and second downlink electric signals, and a signal synthesizer configured to combine the first uplink electric signal received from the antenna and the second uplink electric signal received from the second photodiode into the uplink electric signal, a first wavelength division multiplexer (WDM) disposed between the master unit or the previous remote unit and both the first photodiode and the first laser diode and configured to wavelength-divide each of the uplink optical signal and the downlink optical signal, and a second WDM disposed between the subsequent remote unit and both the second photodiode and the second laser diode and configured to wavelength-divide each of the uplink optical signal and the downlink optical signal.

2. The optical repeater system of claim 1, wherein the first analog circuit further includes:

a first automatic gain controller (AGC) configured to adjust a gain of the downlink electric signal outputted from the first photodiode, and a second AGC configured to adjust a gain of the uplink electric signal outputted from the second photodiode.

3. The optical repeater system of claim 1, wherein each of the plurality of remote units further includes:

a first digital circuit connected to the first and second WDMs and configured to output a downlink digital optical signal, received from a third WDM, to the subsequent remote unit through the second WDM, and to output an uplink digital optical signal, received from the second WDM, to the master unit or the previous remote unit through the first WDM.

4. The optical repeater system of claim 1, wherein each of the plurality of remote units further includes:

an optical switch disposed among the first and second WDMs, one of the master unit and the previous remote unit, and the subsequent remote unit, and configured to connect the first WDM to one of the master unit and the previous remote unit or connect the second WDM to the subsequent remote unit.

5. An optical repeater system comprising:

a master unit connected to a base station;

a plurality of remote units connected to the master unit in a cascade configuration; and an optical delay control device, wherein the plurality of remote units include a first remote unit directly connected to the master unit by an optical cable and a second remote unit directly connected to the first remote unit by another optical cable, wherein the master unit is configured to:

receive a downlink electric signal from the base station, convert the received downlink electric signal into a downlink optical signal of a first wavelength, transmit the converted downlink optical signal to the plurality of remote units through the first remote unit, receive an uplink optical signal of a second wavelength from the plurality of remote units through the first remote unit, convert the received uplink optical signal into an uplink electric signal, and output the converted uplink electric signal to the base station, and wherein each of the remote units is configured to:

receive the downlink optical signal from the master unit or a previous remote unit connected thereto, divide the received downlink optical signal into first and second downlink electric signals, output the first downlink electric signal to an antenna, transmit the second downlink electric signal to a subsequent remote unit connected thereto, receive a first uplink electric signal from the antenna, receive an uplink optical signal from the subsequent remote unit, convert the received uplink optical signal into a second uplink electric signal, combine the first and second uplink electric signals, convert the combined uplink electric signal into the uplink optical signal, and transmit the converted uplink optical signal to the master unit or the previous remote unit, wherein the plurality of remote units include a subset of remote units which are directly connected to the base station, are disposed in a parallel configuration, and form multiple paths with the master unit, and wherein the optical delay control device is provided on the multiple paths, includes a plurality of cable members having different lengths on each of the multiple paths, and is configured to compensate for a propagation delay time of each path by selectively connecting the plurality of cable members to each path.

6. The optical repeater system of claim 5, wherein the master unit is connected to the base station through a wired cable and is configured to transmit or receive at least one of an uplink signal, a downlink signal, or a reference signal for synchronization to or from the base station at an intermediate frequency (IF) band.

7. The optical repeater system of claim 5, wherein the optical delay control device further includes:
- a plurality of optic switches provided on each path to selectively connect the plurality of cable members to each path; and
- a first controller configured to differently control the plurality of optic switches provided respectively on the multiple paths.

8. The optical repeater system of claim 7, wherein each of the plurality of optic switches has two selectable ends,
- wherein two of the optic switches are disposed at both ends of each cable member, respectively, thus forming a pair, and
- wherein one selectable end of the optic switch is connected to one end of the cable member, and other selectable end of the optic switch is connected to the corresponding optic switch in the pair.

* * * * *